Figure 1:
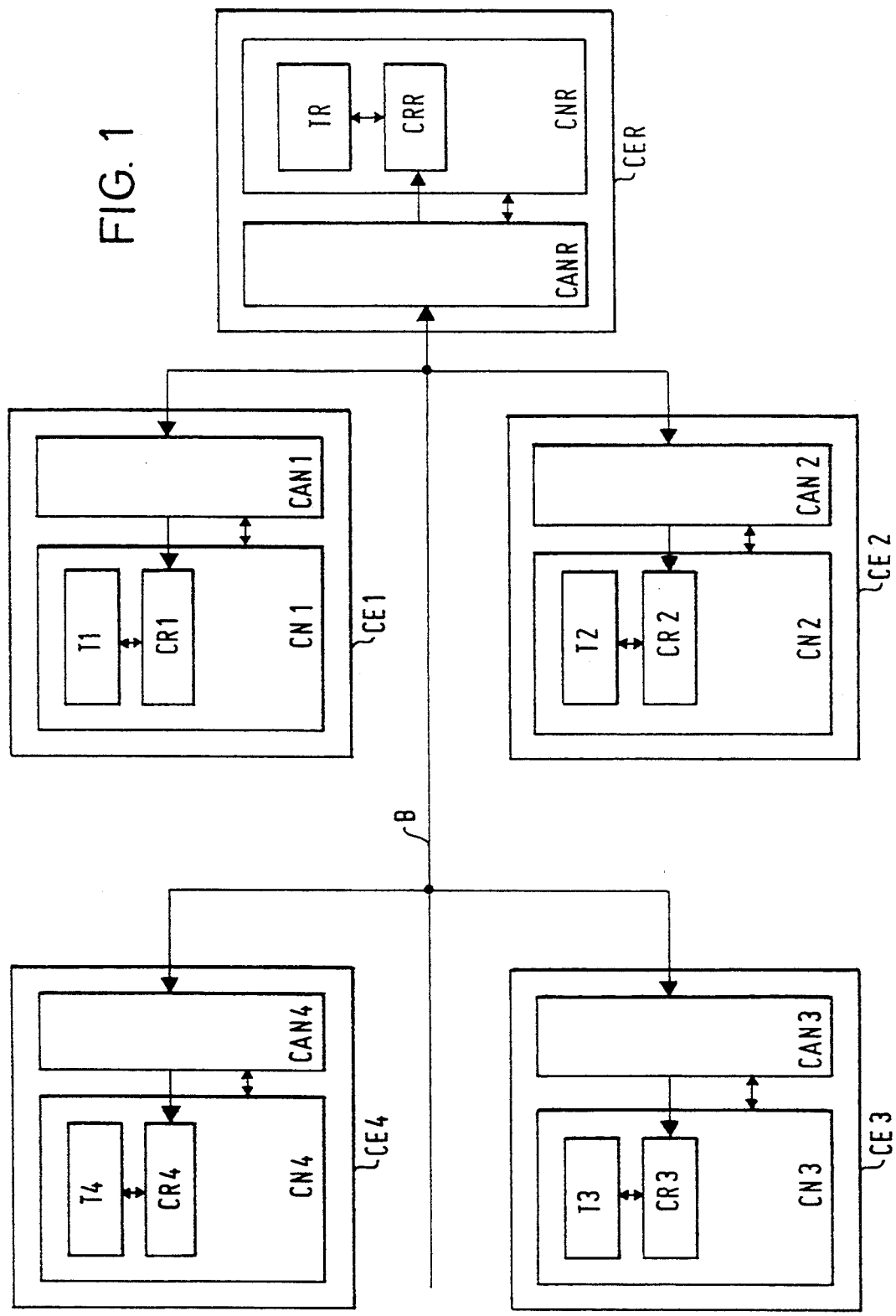

United States Patent [19]

Turski

[11] Patent Number: 5,402,394
[45] Date of Patent: Mar. 28, 1995

[54] PROCESS FOR GENERATING A COMMON TIME BASE FOR A SYSTEM WITH DISTRIBUTED COMPUTING UNITS

[76] Inventor: Klaus Turski, Wildenbruchstrasse 78, 40545 Düseldorf 11, Germany

[21] Appl. No.: 98,288
[22] PCT Filed: Dec. 4, 1992
[86] PCT No.: PCT/EP92/02805
§ 371 Date: Aug. 4, 1993
§ 102(e) Date: Aug. 4, 1993
[87] PCT Pub. No.: WO93/11481
PCT Pub. Date: Jun. 10, 1993

[30] Foreign Application Priority Data
Dec. 4, 1991 [DE] Germany .............. 41 40 017.8

[51] Int. Cl.$^6$ .............. G04B 47/00; G04C 11/00; G06F 9/00
[52] U.S. Cl. .............. 368/10; 368/46; 364/569; 395/550
[58] Field of Search .............. 368/10, 46, 47, 52, 368/155, 156; 364/200, 900, 569

[56] References Cited
U.S. PATENT DOCUMENTS
4,866,606 12/1989 Kopetz .
4,886,981 12/1989 Lentini et al. .............. 307/87
4,890,222 12/1989 Kirk .
5,040,158 8/1991 Lee et al. .............. 368/10

FOREIGN PATENT DOCUMENTS
9013078 11/1990 WIPO .

*Primary Examiner*—Vit W. Miska
*Attorney, Agent, or Firm*—Scully, Scott, Murphy & Presser

[57] ABSTRACT

In a process for operating computing units in communication with each other by serial data transfer over a data bus, each unit having its own clock generating system and the computing units exchanging timing information over the data bus, provision is made to generate a system timing using the transfer protocol that is valid for the system. For this purpose, a time registration start signal is first fed into the data bus; thereupon, each computing unit stores its own time value upon identification of the time registration start signal, transfers the stored own time value at a later moment in time to the other computing units and stores the time values received from the other computing units. Each computing unit then compares its own stored time value with the stored time values of the other computing units and calculates the present time value of the other computing units taking into account its own present time value. Each computing node can thus very accurately ascertain the relationship between its local time base and the local time bases of the other computing nodes, or a reference node, without having to adjust or correct the local time base.

8 Claims, 3 Drawing Sheets

PROCESS FOR GENERATING A COMMON TIME BASE FOR A SYSTEM WITH DISTRIBUTED COMPUTING UNITS

The invention relates to a process for operating computing units in communication with each other by serial data transfer over a data bus, each computing unit having its own clock generating system and the computing units exchanging timing information via the data bus.

Data processing arrangements with distributed computing nodes or computing units that are connected via a serial data bus are used predominately in industrial and automobile local networks. The computing nodes comprise data processing devices or signal processing devices that are intended for a specific application. Also included is data transfer between control devices, sensors and regulators. Such local networks usually operate under real time conditions, i.e. computer operations and control interventions must be carried out to accompany the process in specific time windows so that the timely availability of data is ensured. The relevant process parameters must thereby be transferred punctually to the individual computing nodes to ensure optimal process operation. For a local network this means that the computer nodes make sufficient processing capacity available.

In data transfer one differentiates in principle between so-called "broadcast" systems and "point-to-point" systems. In "broadcast" systems a node supplies its data to the bus and all other nodes can listen in. In a "point-to-point" connection only two nodes can be connected to one another in a defined manner in each case, one being a called node.

An example of the data processing systems defined above is the Controller Area Network (CAN), which represents a defacto standard protocol. CAN is based on the open system interconnection (OSI) reference model, which is recommended for open systems that can be expanded any time to include further participants or computing nodes. CAN differentiates between various levels, such as the physical level, the transfer level and the object level.

The physical level defines in substance how signals are transferred. Parameters involved are the transfer medium, the signal level and the timing, the transfer rate and the bit representation. The transfer level includes the kern of the CAN protocol. It forms the connecting link between the object level and the physical level and is responsible for bit-timing, defining the object or message frame, transfer acknowledgement, error recognition and error handling and for arbitration, i.e. conflict resolution, when a plurality of computer nodes access the bus simultaneously. Finally, the object level is responsible for filtering objects or messages and for the handling of the objects, which are associated with a higher-ranking applications level. Objects or messages are thereby transmitted in both directions from and to different applications levels via the bus and respective intermediate physical levels, transfer levels and object levels. The physical level and the object level can vary in dependence upon the respective implementation. However, the transfer level is defined by the protocol.

The fundamental concept of CAN is based on the idea of a common virtual data memory for all nodes of a data processing arrangement defined above, the network undertaking through its structure the task of actualising the data of this common virtual memory. According to the protocol the data to be transmitted from a computing node via the network is assembled to form messages or objects which correspond to a data frame. In the data frame various fields are defined which, for example, indicate the start and end of the frame and define the actual data field. Each object that is defined by the data frame includes, after a start-bit of the frame, a header (identifier) that is dominant or recessive and defines the data name and a priority of the object, by means of which access to the bus is determined. The value of the header thus has a determining influence on the collision-free arbitration in the network. This means that there are messages which have priority over other messages. According to the CAN-protocol the header is 11 bits long.

The messages or objects to be transmitted via the bus must be administered within a computer node. The transmission itself is a wide band transmission, i.e. without the addressing of a specific receiving node. An object to be transmitted over the bus therefore first arrives at all potential receivers which must then decide which messages or objects should be received from the information flow. The filtering out of the important objects from the information flow occurs on the basis of the headers of the objects.

Control arrangements for the filtering of the objects for acceptance and the evaluation of priority, which takes place at the object level, are known which operate according to different optimisation procedures. An example of a so-called full-CAN implementation is known from DE-PS 35 06 118. The implemented object level carries out the entire data or object administration in the network independently of the connected central unit (CPU) of the computing node. In basic-CAN implementation, the entire object administration is attended to by the central unit contained in the electronic control unit.

Such a data processing arrangement with distributed computing nodes, is used e.g. in real time systems such as control and regulating systems. The elements of a regulating circuit such as desired-value provider, actual-value provider, regulator and control member form distributed components or distributed computing nodes of the data processing arrangement. An example of an actual-value provider is a sensor and an example of a control member is an actuator that acts on the controlled system. The necessary data to be transferred in the control circuit is transferred into the data processing arrangement via the data bus. Each computing node thereby stores the received information that is assigned thereto. The dynamic behaviour of the control circuit is, for example, influenced by sampling rates and delay times of sensor signals and actuator signals. Delays to sensor or actuator signals manifest themselves in the dynamic behaviour as dead times which, in principle, are undesired in control circuits. Dead times may, for example, result in the entire control process being unstable or at least in impairment of its control performance. Such impairment of the dynamic control behaviour can however be compensated in many cases by taking into account the dead times which occur, through adaptation of the control parameters.

In a centralised system the control circuit components are concentrated in one unit and the processing computing unit operates with a single time base. Delay and dead times can therefore be determined and taken into account when processing the control algorithm. With a data processing arrangement of the kind mentioned in the introduction having a distributed system, the individual components however generally have their own clock supplies. Each clock supply includes an oscillator that usually operates asynchronously in relation to the other components or computing nodes. A common time base that might, for example, be provided by a centralised clock arrangement is in most cases excluded due to technical and economical reasons, for example to ensure sufficient electromagnetic tolerability—because with high frequency clock signals there occur electromagnetic emissions into the surroundings—or to keep small the outlay in terms of cabling.

In a distributed data processing arrangement there is therefore the problem that a receiving node is not in a position, due to the different local time bases of the individual computing nodes, to determine the time between the generation of, for example, a sensor signal and the processing thereof. This would be so even in a case in which, in addition to the signal value, the signal generating computing node transmitted the time value of the signal generation, because the receiving node does not know the time base of the transmitted time value.

In the publication IEEE Transactions of Computers Vol. C-36; No. 8, August 1987, pp. 933-940 five different causes of time errors are mentioned. These are as follows:

a) the time lapse between the reading of the individual clock in a transmitting node and the sending of synchronisation information, b) the indeterminate accessing time of a node to the bus (arbitration time), c) the transfer time at the transmitting node, on to the bus and at the receiving node, d) the time lapse in a receiving node between reception of the synchronisation information and the recording, i.e. the storage of the moment in time of reception, e) the granulation time, i.e. the time that is necessary for the resolution of time information by the raster.

The publication does not mention how synchronisation information is transferred from one node via the bus to the other nodes and how it is recorded. Consideration is given to the accuracy a global time system can achieve if the aforementioned errors are assumed. As a result it is ascertained that the local time in each node can either be corrected immediately on the basis of a correction value to be calculated, or that continuous correction can be carried out during the next synchronisation period. This means that a linearly increasing curve, that represents the dependency of a count value on time, then has, in consideration of the master time determined by calculation, either a jump or has a kink in its slope, such that curves of the master and the local time meet at a later moment in time.

Two ways of achieving a common time base for all nodes can be considered. The first possibility may be that the clock reading of a transmitting node is transmitted to the other nodes simultaneously with a message that may be a synchronisation call. This method is very complicated. After a starting pulse, it is necessary first to wait and see if transmission is possible. If so, the obtained time value must still be corrected. The second possibility is to set the clock in the transmitting node to zero and to notify this occurrence simultaneously to the other nodes. This second method is problematic insofar as it is uncertain as to whether the bus is free at the moment in time at which the internal clock of the transmitting node is to be set. To solve this problem the timing message must be given the highest priority.

The possibility of synchronising the individual computing nodes by a common time signal that is transmitted on the bus is, as a rule, excluded because this is associated with the difficulty that disturbances on the bus may be evaluated as synchronisation signals by the computing nodes.

In distributed data processing arrangements of the kind mentioned in the introduction, time synchronisation is therefore not provided. For example, in known CAN networks the implementations of CAN controllers do not deliver any temporal information out of the transfer level.

The computing node, i.e. essentially the central processing unit (CPU) gives, in the case of messages that are to be transmitted from the node, only a transmission command to the object level. This level effects the transmission autonomously according to the priority provided for the message, without providing the computing unit with information on the exact moment in time at which the message is transmitted. This means that the computing unit does not know beforehand when a message can go out. The same applies when receiving messages from the CAN bus. Here the CAN controller carries out the entire receiving process autonomously, in accordance with the filtering provided, and does not give information about the exact receiving times to the central computing unit of the associated computing node. The central unit of such a computing node therefore does not receive temporal information either directly via output signals from the CAN controller or via the object level.

It is therefore an object of the invention to provide a possibility for a process for operating computing units which are in communication with each other by serial data transfer over a data bus, each computing unit having its own clock generating system and the computing units exchanging timing information over the data bus, with which an accurate time base for the system can be generated.

This object is achieved by the features of claim 1.

The invention has the advantage that it enables the introduction of a global time base in a distributed data processing arrangement. The invention makes use of the protocol provided for the exchange of objects, so that a centralised clock supply is not necessary. With the assistance of the global time system it is possible to take into account time delays between the generation of a data signal and processing thereof. Dead times can therefore be taken into account and, for example, the dynamics of a control circuit can be improved. With the assistance of the global time base a signal generating computing node can transfer a time value, with an information value or signal value, which time value is converted from its local time base into the global time base. The receiving computer node or nodes, in which the information signal is to be processed, can convert the transferred time value into their local time base and thus determine the overall delay between generation of the signal and processing of the signal. The advantage of a distributed data processing arrangement of being expandable to almost any extent is retained without great outlay. The process according to the invention can advantageously be used in both a "broadcast" system and a "point-to-point" system.

A substantial advantage of the invention is that the clocks of the individual nodes are not synchronised to the clock of a certain node, for example by adjusting counter values, but instead each node can calculate the time at another node by means of a transformation. The invention removes the need for continuous or discontinuous correction of a local time: rather each node is in a position to calculate the actual time of another node. In the case of a plurality of nodes with internal clocks having different stabilities there is thus provided for the more stable clocks, which have linear or almost linear time changes, extensive synchronisation, even when dissimilar rates of time change exist. The differences in the clock counter values caused by dissimilar time changes can simply be factored out by the transformations.

Embodiments of the invention are characterised in the subclaims.

Figure 2:
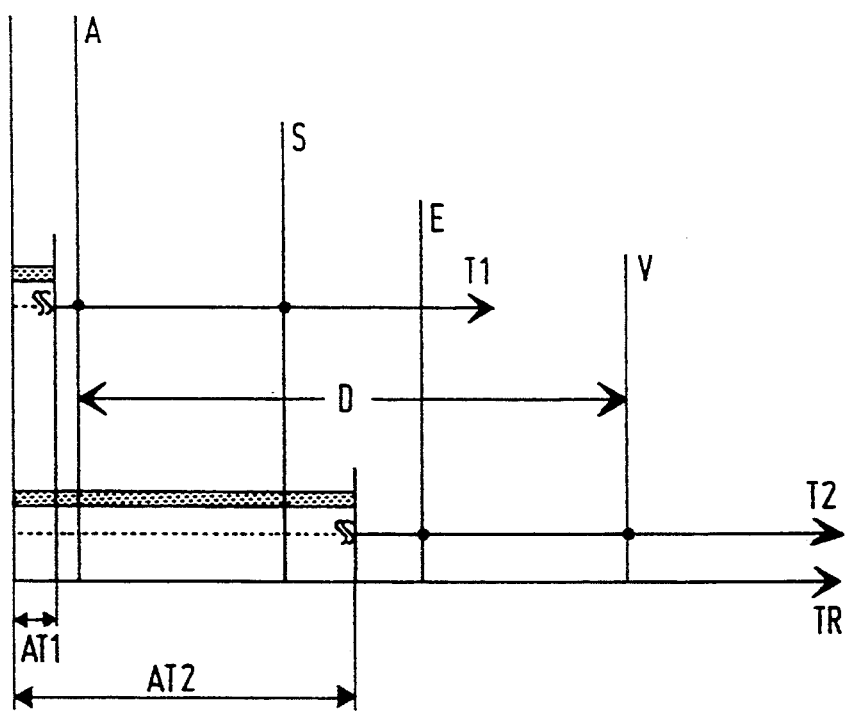
Figure 3:
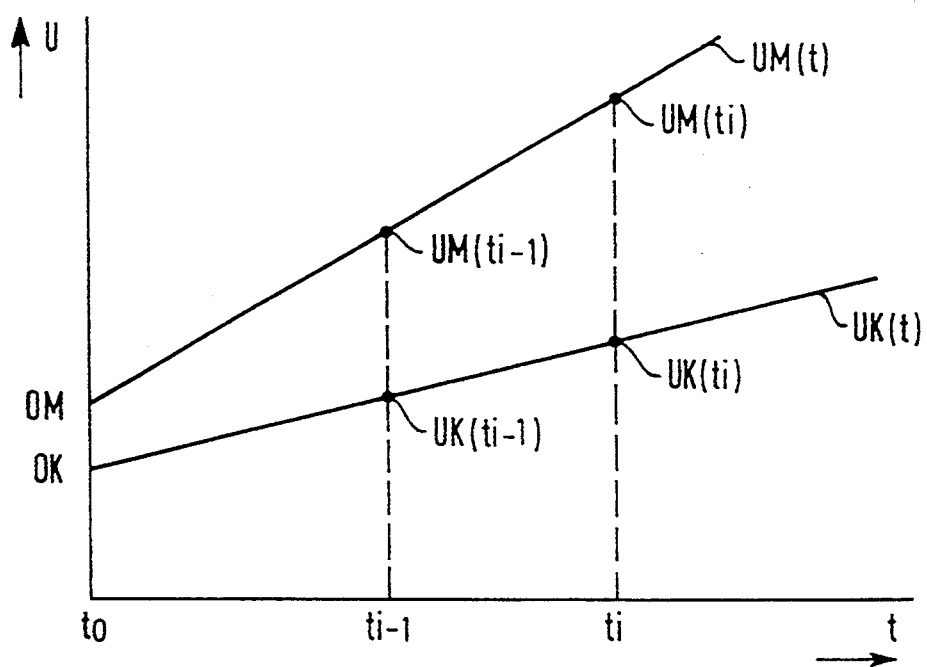

The invention will now be described with reference to the drawings, in which:

FIG. 1 shows a circuit diagram illustrating the principle of a data processing arrangement according to the invention, FIG. 2 is a diagram for assistance in explaining timing relationships, and FIG. 3 is a diagram for assistance in explaining transformation equations.

As shown in FIG. 1 a data processing arrangement includes CAN units CER and CE1 to CE4. Each CAN unit, which represents merely an exemplary configuration, is implemented as a so-called basic CAN unit. This means that CAN controller CANR, and CAN1 to CAN4 are provided along with computing nodes CNR and CN1 to CN4. The CAN controllers attend to acceptance filtering and input buffering. The object administration and the application is carried out by the computing nodes. The individual CAN units are connected to one another by a data bus B. The messages or objects that are exchanged between the individual CAN units arrive on the data bus B from the computing node via an object level and a transfer level associated with the computing node. Inversely, objects arrive from the data bus via the transfer level and the object level at the computing node. According to the CAN structure the physical level is also interposed between the transfer level and the data bus B.

The CAN system considered here operates according to the "broadcast" method. The invention that is described below is, however, also possible with a "point-to-point" system.

According to the invention each node can compare its own clock time to the clock time of the other nodes. For this purpose one of the nodes supplies a synchronisation message to the bus. This synchronisation message consists, like other messages, of a bit frame. The bits contain the indication that the message is a synchronisation message. When the synchronisation message that is transmitted from a node with or without priority arrives on the bus, all other nodes receive this synchronisation message. On receiving this message all other nodes record their momentary counter values. The synchronisation message transmitted from a node may, but need not, contain the counter value of the transmitting node; it needs merely to be a request to record the time.

On feed-in of a synchronisation message, i.e. a request to read the time, time reading must occur in each node including the transmitting node as simultaneously as possible and as reliably as possible.

One possibility of ensuring the greatest accuracy with regard to simultaneity is to record the own counter value at the moment of the starting edge of the received message. At this moment in time none of the receiving nodes knows whether the received message is a request for synchronisation. This can first be determined when the complete message is available, from which it can be ascertained whether it was a request for synchronisation. If the evaluation of the received message shows that it did not concern a synchronisation message, the recorded counter value is deleted again. If, however, the evaluation of the message shows that it was a synchronisation request, the recorded own counter value is retained and can now be fed into the bus by the receiving node at a later time.

After the storing process, the individual nodes transmit the recorded counter values to the bus so that each other node now has knowledge of the internal clocks of the other nodes.

With regard to the greatest accuracy it is not necessarily obligatory to synchronise at the starting edges of a bit frame: other moments in time within the frame are conceivable and possible at which recording of the counter value of the internal clock of a node can occur.

In the case of long frames the CAN protocol provides for repeated synchronisation with the transmission raster after the starting edge of the frame, namely by hardware means through triggers. This means that on the edge of a predetermined bit in the frame the scanning raster of the receiving computing node is adapted to the raster of the frame being received. This is termed "hard synchronisation". This hard synchronisation is necessary to avoid the scanning raster deviating so far from the raster of the frame being received, due to the different running of the transmitting clock and the receiving clock, that identification of the bits, i.e. evaluation of the frame, would no longer be possible. This means that the local bit time counters of the receiving node begin to count anew at both the starting edge of a received message and at a hard synchronisation point. Independently thereof the internal clock of each node continues to run and is not stopped. However the counter value of the internal clock of the node is recorded either at the moment of the starting edge of the received frame or at the moment of hard synchronisation.

In each case the counter value of the internal clock of a node at a predetermined moment in time is recorded. In particular in the case of CAN, only thereafter is the entire message evaluated and errors corrected. Only then can it be ascertained whether the message is a synchronisation request.

When uniformity of operation of the internal clocks is ensured, which however is not the case in practice, a time comparison at a single moment in time is sufficient. If the counter speeds of the counters representing the internal clocks of the individual nodes are different but uniform, i.e. linear, the transmission of the counter values at two successive moments in time suffices. If the counter values are not linearly dependent upon time then more than two moments in time are necessary for verification.

According to the invention each node is in a position to calculate the actual time of other nodes. Continuous or discontinuous correction of a local time therefore need not occur. Thus, with a plurality of nodes with internal clocks having different stabilities there is provided a large degree of synchronisation for the more stable clocks that have linear or almost linear time changes, even when dissimilar rates of time change may be present. The differences in the clock counter values caused by dissimilar time changes, i.e. non-linear characteristics, can easily be factored out again through transformations.

With a plurality of nodes one strives to declare one or at least a few nodes as master nodes, namely that or those nodes with the most stable clocks. In this way it can be avoided that all nodes must announce their counter values to the bus in response to a synchronisation request and the bus be excessively loaded with information. If, for example, one node is selected as master node, in response to a synchronisation command only this master node need announce its counter value via the bus to the other nodes in response to a synchronisation request, and the other nodes can then relate their time to the master time. The other nodes can communicate with one another after appropriate conversion with the master time.

If, however, in response to a synchronisation request all nodes should initially announce their counter readings to the bus and thus to the other nodes, this is done in order to determine in this way, with an appropriately provided protocol, which nodes or node have the most stable clock. The nodes can then agree which node is to be selected as master node. Relativisation of the timing information according to the invention can then take place.

According to the invention the errors a), b) and d) listed in the IEEE publication mentioned in the introduction can be avoided. There is thus a substantially greater accuracy when measuring time and thus a global time base.

The invention thus avoids that a node, immediately upon a synchronisation request, i.e. within the same frame, announces its own time and/or that the local clocks are stopped or adjusted. According to the invention there is first only a request to measure time and thereafter it is decided whether the request should really serve for time measurement. If this was not the case, the measured time is deleted again. If this was the case, the measured time is stored further and communicated to the other nodes in a later information gap.

To generate a common global time base according to FIG. 1 a computing node and its local time base is selected as reference computing node CNR with a reference time base. The reference or master computing node CNR accesses the bus via its CAN controller CANR. Time synchronisation information communicated from the reference computing node is recognised by a receiving node if the timing information is included in the transmission protocol. On the basis of the identification possibilities of the transmission protocol it is possible to recognise whether an object transmitted via the bus is valid or not. A receiving node examines an arriving object first in the transfer plane to determine whether the object is valid. In the object level it is then ascertained whether this object includes timing information.

It is provided that information about the moment in time of exact transmission or reception of an object is supplied out of the transfer level to the connected computing nodes. Implementation occurs in the CAN controller. The transmission or receiving information of the transfer level is supplied to the computing nodes either via the object level and/or via the output signals of the CAN controller.

For the generation of a global time base, i.e. the synchronisation of the computing nodes, it is provided that after the selection of a computing node as master- or reference computing node, this reference computing node CNR sends out a synchronisation object that is received substantially simultaneously at all other computing nodes, i.e. the reception of objects can be considered with sufficient accuracy to be simultaneous for all network nodes. The transmission of the synchronisation object is determined in the transfer level of the reference computing node and reception of the synchronisation object is determined in the transfer levels of the other computing nodes. All transfer levels supply a message to their associated computing nodes. On receiving the message from the transfer level each computing node stores its local time, i.e. also the reference computing node. Thereafter in the reference computing node it is determined when the synchronisation object really was sent. All other computing nodes record the time at which the synchronisation object arrived at them. Later, the reference computing node informs the other computing nodes of its stored reference time, at which the synchronisation object was sent. The other computing nodes likewise inform the other nodes of their stored times. Each computing unit can thus calculate its time with reference to the reference time or to the times of the other nodes.

It is provided that qualification of timing information from the transfer level by information from the object level can occur, i.e. the supply of timing information out of the transfer level can be linked to specific objects that are characterised as synchronisation objects or time comparison messages. If, for example, the timing information is supplied out of the transfer level directly to the computing nodes via output signals of the CAN controller, the CAN controller generates synchronisation signals that are either generated unqualified with each object going over the bus, or are qualified by information from the object level and are only generated by specific objects, for example characterised by their headers or identifiers. The moment in time at which these messages or synchronisation information of the CAN controller are issued to the associated computing node has a predetermined timing relationship with the start bit of an object frame. It is thus taken into account that the start bit of an object or synchronisation object of the reference computing node is the bit to which all bits contained in the object frame according to the protocol are synchronised. This means that the bit edge of the start bit is the most accurate edge in an object frame. The start bit of an object frame therefore first supplies an unqualified time signal, of which qualification is possible by the contents of the object. It is therefore ascertained in the transfer level that the message is valid, whilst the object level ascertains that it is a time object. A receiving computing node can therefore determine the local time and store it each time an object arrives.

If, after identification of the object, it is ascertained that it does not include timing information supplied by the reference computing node, the stored local time of the receiving node is deleted. If, however, it is ascertained that timing information is involved, the deleting mechanism is made inoperable so that the local time can remain stored. With the notification of the reference time or the times of the other nodes, the temporal relationship of the local time is established.

In principle each computing node requires, in the case of stable clocks, only the knowledge of its own time and the reference time or the other times. From the knowledge of these times it can extrapolate future local times in relation to the reference time. This characteristic applies to each node. Each computing node can thus provide its objects to be transmitted to the bus with timing information that has been calculated on the basis of the reference time. Both a transmitting node and the connected receiving nodes can thus relate their timing information to one and the same event, namely the reference time of the reference computing node. A prerequisite is that all messages or objects appear sufficiently simultaneously at all network nodes.

The time base of a CAN computing node comprises as a rule an oscillator that oscillates at a certain frequency, and a counter. As the frequencies of the individual oscillators usually differ from one another, the time bases of the computers also differ. When, after a synchronisation object and the message or the synchronisation signal from the transfer level to the computing nodes, the synchronisation moment is established, each computing node can, with knowledge of the frequency of the other counters, calculate for the future its own time and the relationship to the local times of the other nodes, based on the reference time. If the frequencies of the time bases of the other computing nodes are not known, two synchronisation processes must take place successively in order to be able to determine the local time bases of the respective computing nodes. It is thereby assumed in the first approximation that the counter values in the time bases of the computing nodes form, in the first approximation, linear functions of time. Possible nonlinear characteristics of the time bases of the individual computing nodes are taken into account by repeating the process of synchronisation periodically.

In a preferred exemplary configuration of the computing nodes shown in FIG. 1 each node comprises a clock generator TR and T1 to T4 and a capture register CRR and CR1 to CR4. As is indicated symbolically, on receiving an object from the bus B a CAN controller supplies the command to the associated capture register CRi to hold the momentary time of the associated clock generator Ti. Holding occurs with the start pulse of the received object frame. If, after evaluation of the object frame, it is determined that this includes timing information, the determined local time of the clock generator Ti remains stored, otherwise it is deleted. As bus running times are presumed not to play any role, so that objects on the bus are present at all network nodes substantially simultaneously, the command of the CAN controller of each computing node to record the time or the appropriate message from the transfer level to the computing nodes and the subsequent storing of the local time in all computing nodes goes out substantially simultaneously.

The diagram in FIG. 2 explains the temporal relationships when sending an object from the computing node CAN1 to the computing node CAN2 taking into account the global time base of the computing node CNR. The computing node CAN1 with its time base T1, which in relation to the time base TR manifests the difference $\Delta T1$, generates at the moment in time A a scanning signal of a sensor. This scanning signal is supplied to the bus, taking into account its priority, at the moment in time S and is received at the CAN unit CE2 at the moment in time E. This unit has the time base T2, which in relation to the reference time TR manifests the difference $\Delta T2$. The object received at the moment in time E is processed at the moment in tame V. The difference in time between the generation of a scanning signal at the moment in time A, and the processing of its information at the moment in time V thus amounts to D. The invention makes it possible for the receiving computing node to ascertain not only the receiving time of the object and its processing, but also the moment in time of sending of the object at the computing node on the basis of the common time base, if this computing node notified the receiving node of the moment in time A of transmission with regard to the common time base. The overall delay time D can thus be taken into account, for example in a regulatory process.

FIG. 3 shows an example for the transformation equations in the case of two linearly time dependent clocks of two computing units. Clock times U result for the nodes M and K which can be described with straight equations wherein $\Delta$ is the gradient, t is the time and O a starting value or offset:

$$UM(t) = \Delta M \cdot t + OM$$

$$UK(t) = \Delta K \cdot t + OK.$$

After taking two time readings at the assumed moments in time $t_i$ and $t_{i-1}$, the computing node K can calculate by means of the stored clock values $Uk(t_i)$ and $Uk(t_{i-1})$ and the transmitted clock values $UM(t_i)$ and $UM(t_{i-1})$ of the node M the following transformation equations:

$$\Delta K, M = \Delta M \frac{Uk(t_i) - Uk(t_{i-1})}{UM(t_i) - UM(t_{i-1})}$$

$$OK, M = Uk(t_{i-1}) - \Delta K, M(t_{i-1} - t_0).$$

Corresponding equations apply to the computing node M which, by means of its stored moments in time and the transmitted moments in time of the node K, can calculate:

$$\Delta M, K = \Delta K \frac{UM(t_i) - UM(t_{i-1})}{Uk(t_i) - Uk(t_{i-1})}$$

$$OM, K = UM(t_{i-1}) - \Delta M, K(t_{i-1} - t_0).$$

From the equations and from FIG. 3 it is apparent why each involved computing node must store the time values at the time readings.

The generation of a global time base in practice will be explained with reference to qualified timing information. Timing information of the reference computing node in a transmitted object includes, within the object frame, a header (identifier), to which a predetermined number is assigned. The header signals the receiving node that a time comparison message is involved. Priorization of the message is possible. This arrangement applies in common to all computing nodes. It is advantageous to activate the synchronisation arrangements of the connected computing nodes with a first object from the reference computing node. After receiving the first time object, each computing node reacts with its synchronisation arrangement to each start pulse of a received object. On receiving a second object each computing node knows that the start pulse is the moment in time with which synchronisation should take place. The deleting mechanism, for example in the capture register, is thereby made inoperable so that no new local time value is recorded. With a third object from the reference computing node, the transmitting reference time of this node is communicated.

With the assistance of the invention it is possible to instal a global time base in a distributed data processing arrangement with which timing information about objects can be dealt with in a manner extending over all nodes. The synchronisation mechanisms necessary therefor are determined by means of the data transfer protocol. With an implementation of this kind the timing information made available can then be obtained directly via the serial data bus without a central clocking arrangement being necessary. The advantage of being able to expand the distributed data processing arrangement without any problems is retained.

I claim:

1. Process for operating computing units in communication with each other by serial data transfer over a data bus, with each computing unit having its own clock generating system and the computing units exchanging timing information over the data bus, characterized by the steps of:
   a) feeding a time registration start signal into the data bus;
   b) each computing unit storing its own time value upon identification of the time registration start signal;
   c) at least one computing unit selected as reference computing unit transferring its own stored time value to the other computing units at a later moment in time; and each computing unit:
   d) storing the time values received from the other computing units;
   e) comparing its own stored time value with the stored time values of the other computing units; and
   f) calculating the present time values of the other computing units while taking into account its own present time value.

2. Process according to claim 1, characterized by the steps of:
   a) feeding two or more time registration start signals into the data bus at successive moments in time;
   b) each computing unit storing its corresponding own time value upon identification of each time registration start signal;
   c) at least one computing unit selected as reference computing unit transferring its own stored time values to the other computing units at a later moment in time or at later moments in time; and each computing unit:
   d) storing the time values received from the other computing units;
   e) comparing its own time values with the stored time values of the other computing units; and
   f) calculating the present time values of the other computing units while taking into account its own present time value.

3. Process according to claim 1 or claim 2, characterized by the step of feeding the time registration start signal or the time registration start signals into the data bus by one of the computing units.

4. Process according to claim 1 or claim 2, characterized by the step of using a characteristic part of a data series as the time registration start signal.

5. Process according to claim 4, characterized by the step of providing verifying data for the time registration start signal, and providing the data series with a time registration start signal.

6. Process according to claim 5, characterized by the step of each computing unit deleting its own time value, stored when a time registration start signal appeared on the data bus, if the computing unit does not recognize verifying data belonging to the time registration start signal.

7. Process according to claim 4, characterized by the step of using a first pulse edge of a data series as a time registration start signal.

8. Process according to claim 4, characterized by the steps of, in the case of a longer data series, synchronizing hardware, of the pulse raster generated by the receiving computing unit, with a synchronizing signal contained in the data series, for bit identification of the received data, and using the synchronization signal as the time registration start signal.

* * * * *